United States Patent [19]

Guest

[11] Patent Number: 5,775,742
[45] Date of Patent: Jul. 7, 1998

[54] TUBE COUPLINGS

[76] Inventor: John Derek Guest, "Iona", Cannon Hill Way, Bray, Maidenhead, Berkshire SL6 2EX, United Kingdom

[21] Appl. No.: 687,808

[22] Filed: Jul. 26, 1996

[30] Foreign Application Priority Data

Jul. 28, 1995 [GB] United Kingdom .............. 9515473

[51] Int. Cl.⁶ .................................................. F16L 37/02
[52] U.S. Cl. ........................................ 285/323; 285/322
[58] Field of Search ............................. 285/105, 322, 285/323

[56] References Cited

U.S. PATENT DOCUMENTS

| | | |
|---|---|---|
| 1,428,949 | 9/1922 | Eastman . |
| 4,188,051 | 2/1980 | Burge ............................ 285/104 |
| 4,194,769 | 3/1980 | Bram ........................... 285/321 X |
| 5,230,539 | 7/1993 | Olson ............................ 285/323 |
| 5,580,100 | 12/1996 | Umezawa et al. ............ 285/308 X |

FOREIGN PATENT DOCUMENTS

| | | |
|---|---|---|
| 0 268 251 | 5/1988 | European Pat. Off. . |
| 0 587 433 | 3/1994 | European Pat. Off. . |
| 0 628 760 | 12/1994 | European Pat. Off. . |

*Primary Examiner*—John A. Ricci
*Attorney, Agent, or Firm*—Baker & Daniels

[57] ABSTRACT

The disclosure relates to a tube coupling comprising a coupling body having a throughway open at one end to receive a tube, the diameter of the throughway increasing towards said open end at a first step to form a first enlarged diameter portion to receive a tube and at a second step to form a second, further enlarged diameter portion to receive a tube locking device to hold a tube in the coupling body. A thin wall sleeve has one end engageable in the throughway and the other end engageable in a tube to be located in the coupling body so that, in use, the sleeve extends from the tube passed the first step into the throughway. The end part of the tube in the throughway is engaged by a seal located in the throughway to prevent ingress of fluid between the sleeve and throughway.

7 Claims, 2 Drawing Sheets

5,775,742

TUBE COUPLINGS

BACKGROUND OF THE INVENTION

1. Field of the Invention

This invention relates to tube couplings in which a coupling body has an open ended throughway to receive an end of a tube with a locking device in the coupling body to engage and hold the tube in the body for flow of fluid between the tube and throughway in the body.

2. Background prior art

Such tube couplings are commonly used in apparatus for dispensing drinks such as colas, other carbonated drinks and beers and ciders. Any gaps or pockets however small provide areas where fluids can accumulate and stagnate unless the apparatus is very effectively cleaned which is difficult in the case of very narrow pockets which may result from the construction of tube couplings. Where fluids accumulate over a period of time they inevitably "go off" and the resulting material formed harms the taste of the fresh fluids being dispensed through the system and also creates a health risk.

SUMMARY OF THE INVENTION

This invention provides a coupling body having a throughway open at one end to receive a tube, the diameter of the throughway increasing towards said open end at a first step to form a first enlarged diameter portion to receive a tube and at a second step to form a second, further enlarged diameter portion to receive a tube locking device to hold a tube in the coupling body, and a thin wall sleeve having one end engageable in the throughway and the other end engageable in a tube to be located in the coupling body so that, in use, the sleeve extends from the tube passed the first step into the throughway, the end of the tube in the throughway being sealed to the throughway to prevent ingress of fluids between the sleeve and throughway.

Preferably said one end of the sleeve has an integral encircling annular seal which bears against the throughway to seal the end of the sleeve to the throughway.

It is also preferred that the sleeve has an integral annular flange formed partway along the sleeve from said one end to locate between the end of the sleeve and the first step.

The portion of the sleeve to engage in the tube may be formed with one or more integral annular barbs encircling the sleeve to engage in the tube and retain the sleeve in the tube so that when the tube moves slightly outwardly of the coupling body the portion of the sleeve projecting into the throughway is withdrawn by a corresponding amount, the sealed end of the tube remaining in sealing engagement with the throughway.

More specifically the sleeve may have two encircling barb shaped projections in spaced locations along the sleeve to engage the inner surface of the tube.

The length of the sleeve engaged in the tube may be such that the end of the tube is visible at the open end of the coupling body when a transparent or translucent sleeve material is used for the tube so that the position of the end of the sleeve will indicate whether or not the tube has been fully engaged in the tube coupling.

In any of the above arrangements the tube locking device may comprise a collet having an annular portion and a plurality of resilient fingers projecting into the coupling body and the coupling body has a tapered internal cam surface reducing it in diameter towards the open end with which the fingers of the collet are engageable to be com- pressed against the surface of the tube to lock the tube in the coupling body.

DESCRIPTION OF THE PREFERRED EMBODIMENT

Figure 1:
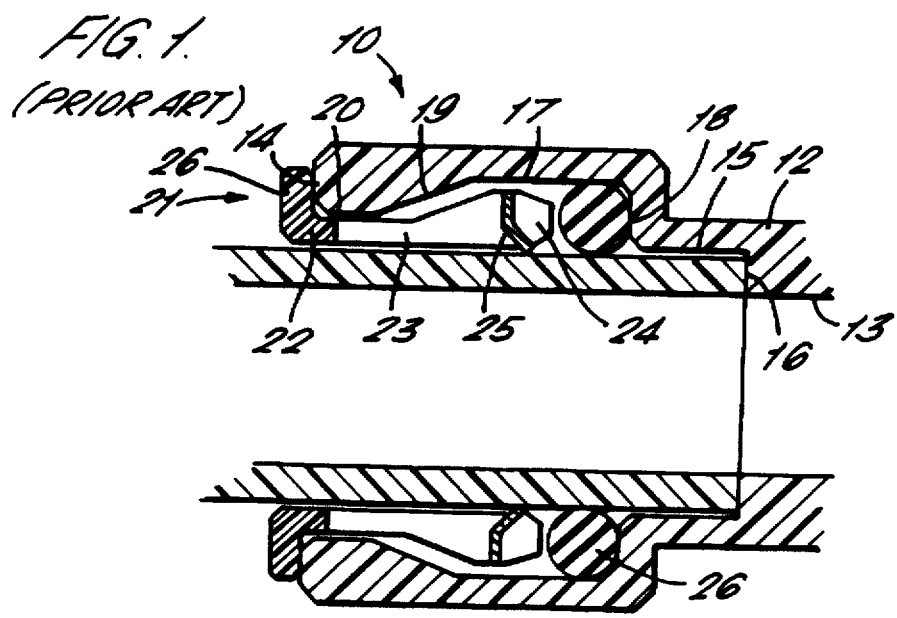
FIG. 1 is a sectional view through a known form of tube coupling having a collet and locking device with a tube fully inserted in the coupling prior to engagement of the locking device.
Figure 2:
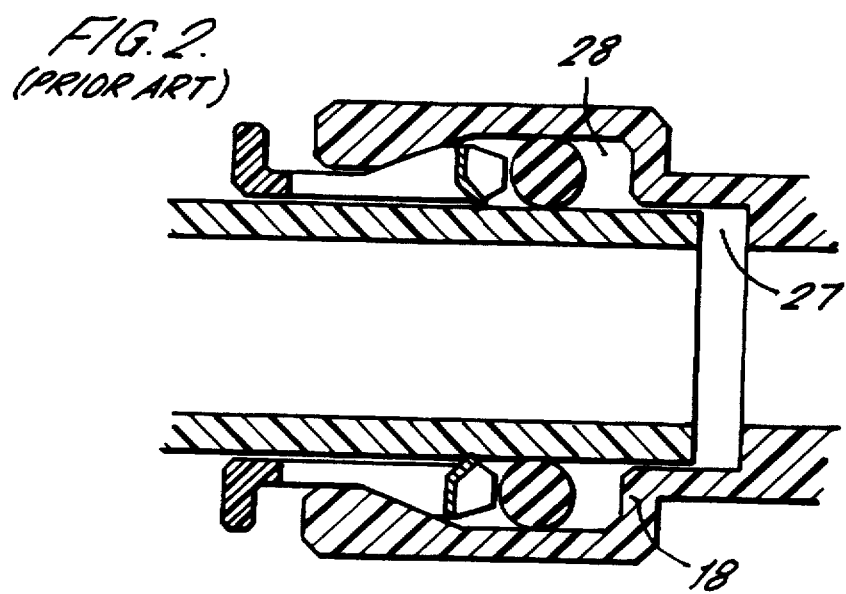
FIG. 2 is a sectional view through the coupling of FIG. 1 showing the collet and tube retracted slightly to engage the gripping action of the collet on the tube.
Figure 3:
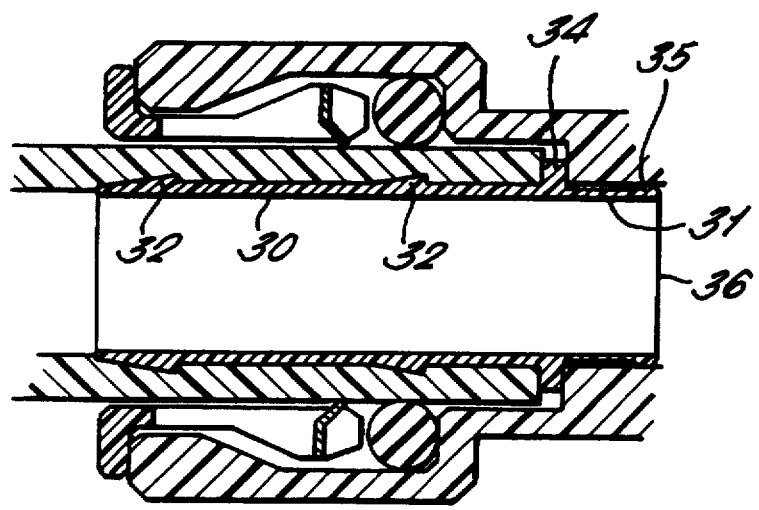
FIG. 3 is a similar view to FIG. 1 embodying a sleeve to isolate potential but traps from the throughway and tube prior to engagement of the collet locking device.

Referring firstly to FIG. 1 of the drawings, there is shown a tube coupling indicated generally at 10 for a tube 11. The coupling comprises a coupling body 12 through which a throughway 13 extends to an open end 14. Towards the open end, the throughway is formed with a first enlarged diameter portion 15 at a step 16 facing towards the open end of the coupling body and a second further enlarged diameter portion 17 at a second step 18 also facing towards the open end of the coupling body. The enlarged diameter portion 17 is formed with a tapered cam surface 19 reducing towards the open end of the coupling body and terminating in a short plane cylindrical entry 20 at the open end of the coupling body.

The enlarged diameter portion of the coupling body contain a collet indicated at 21 for locking the tube 11 in the coupling body. The collet has an annular portion 22 formed with resilient fingers 23 projecting axially into the throughway and having heads 24 at their distal ends incorporating angled teeth 25 to grip and engage the tube. The collet is completed by an out turned head or flange 26 encircling the annular part of the collet which overlies the end 14 of the coupling body around the open end of the throughway.

A tube 11 to be locked in the coupling body is inserted into the coupling body through the collet into the first enlarged portion of the throughway 15 and the end of the tube is engaged with the step 16. An 0-ring seal at 26 is mounted in the further enlarged portion of the throughway against the step 18 to seal between the throughway step and surface of the tube to prevent loss of fluid from the coupling body.

The teeth or barbs 25 on the heads 24 of the collet have an initial grip with the surface of the tube so that when the tube is retracted slightly after insertion into the coupling body either manually or as a result of fluid pressure within the tube/throughway, the heads 24 of the collet are drawn into engagement with the tapered cam surface 19 which compresses the heads against the surface of the tube to provide a gripping action with the tube sufficient to prevent the tube from being extracted from the coupling body. As a result of the slight retraction of the tube, a small gap 27 is formed between the end of the tube and step 16 and there is also a void 28 between the seal 26 and step 18 in which fluids/solids can be trapped and "go off" if allowed to.

In accordance with the present invention, a thin wall flexible sleeve 30 is mounted in the tube end and has a portion 31 which projects into the throughway 13 to bridge across the step 16 between the tube and sleeve. A tube 30 has two spaced annular barb cross section projections 32 on its outer surface shaped to hold the sleeve in the tube after insertion of the sleeve in the tube. The sleeve is formed with an outwardly projecting integral annular flange 34 which overlies the end of the tube to engage between the tube and step 16 and to ensure that the portion 31 of the tube which engages in the throughway is sufficiently long to remain in engagement with the throughway even after the tube and sleeve have retracted slightly to engage the gripping action of the collet as described above.

The wall thickness of the portion of the sleeve projecting from the flange 34 into the throughway is slightly less than the wall thickness of the sleeve within the tube to accommodate an annular integral seal 35 formed around the outer side of the open end 36 of the sleeve in the throughway. The seal engages the inner surface of the throughway to prevent penetration of fluids between the sleeve and throughway.

Figure 4:
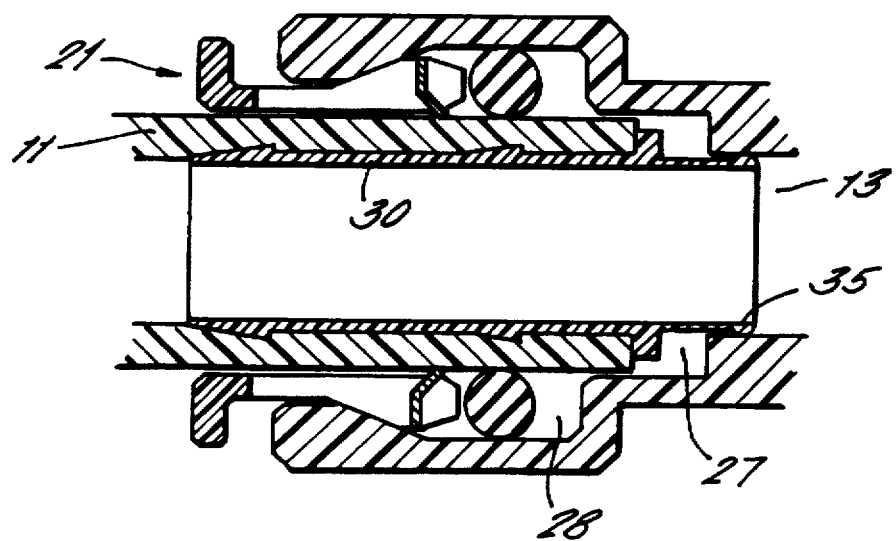
FIG. 4 is a similar view to FIG. 3 showing the tube retracted slightly to engage the collet form locking device with the tube.

As can be seen in FIG. 4, when the tube 11 and sleeve 30 have retracted slightly to engage the gripping action of the collet with the tapered cam surface in the coupling body, the sleeve slides with the tube partially out of the throughway 13 but leaving an end portion of the sleeve with the annular seal 35 still in effective sealing engagement with the throughway to prevent entry of fluids into the voids 27 and 28 created by the movement of the tube. Thus a smooth continuous surface is preserved between the tube and throughway with no gaps or voids where fluids may accumulate.

The length of the sleeve 30 within the tube 11 is chosen so that the end of the sleeve in the tube is visible from outside the coupling body if transparent or translucent tube materials are used so that the location of the end of the sleeve can be used to judge whether the end of the tube has been fully inserted in the coupling body or not.

Although the above arrangement still retains an 0-ring seal, it may be omitted and the sleeve relied upon to provide the sealing function between the tube and coupling body.

I claim:

1. A tube coupling comprising a coupling body having a throughway open at one end to receive a tube, the diameter of the throughway increasing towards said open end at a first step to form a first enlarged diameter portion to receive a tube and at a second step to form a second, further enlarged diameter portion to receive a tube locking device to hold a tube in the coupling body, and a thin wall sleeve having one end slidably engaged in the throughway and the other end engageable in a tube to be located in the coupling body so that, in use, the sleeve extends from the tube past the first step into the throughway, the end of the tube in the throughway having a sealing engagement with the throughway to prevent ingress of fluids between the sleeve and throughway.

2. A tube coupling as claimed in claim 1, wherein the sleeve has an integral annular flange formed partway along the sleeve from said one end to locate between the end of the sleeve and the first step.

3. A tube coupling as claimed in claim 1, wherein the portion of the sleeve to engage in the tube is formed with one or more integral annular barbs encircling the sleeve to engage in the tube and retain the sleeve in the tube so that when the tube moves slightly outwardly of the coupling body the portion of the sleeve projecting into the throughway is withdrawn by a corresponding amount, the sealed end of the tube remaining in sealing engagement with the throughway.

4. A tube coupling as claimed in claim 3, wherein the sleeve has two encircling barb shaped projections in spaced locations along the sleeve to engage the inner surface of the tube.

5. A tube coupling as claimed in claim 1, wherein the length of the sleeve engaged in the tube is such that the end of the tube is visible at the open end of the coupling body when a transparent or translucent sleeve material is used for the tube so that the position of the end of the sleeve will indicate whether or not the tube has been fully engaged in the tube coupling.

6. A tube coupling as claimed in claim 1, wherein the tube locking device comprises a collet having an annular portion and a plurality of resilient fingers projecting into the coupling body and the coupling body has a tapered internal cam surface reducing it in diameter towards the open end with which the fingers of the collet are engageable to be compressed against the surface of the tube to lock the tube in the coupling body.

7. A tube coupling comprising a coupling body having a throughway open at one end to receive a tube, the diameter of the throughway increasing towards said open end at a first step to form a first enlarged diameter portion to receive a tube and at a second step to form a second, further enlarged diameter portion to receive a tube locking device to hold a tube in the coupling body, and a thin wall sleeve having one end engageable in the throughway and the other end engageable in a tube to be located in the coupling body so that, in use, the sleeve extends from the tube past the first step into the throughway, the end of the tube in the throughway being sealed to the throughway to prevent ingress of fluids between the sleeve and throughway; wherein the improvement comprises forming said one end of the sleeve with an encircling annular seal which bears against the throughway to seal the end of the sleeve to the throughway.

* * * * *